United States Patent
Yeh et al.

(10) Patent No.: US 9,654,940 B2
(45) Date of Patent: May 16, 2017

(54) SENDING AND RECEIVING MESSAGES OVER WIRELESS LOCAL AREA NETWORKS

(71) Applicant: Cellco Partnership, Basking Ridge, NJ (US)

(72) Inventors: Ning-Chia Yeh, Dublin, CA (US); Amir Mayblum, Walnut Creek, CA (US); Zhijian Lin, Dublin, CA (US); Kumar Sanjeev, San Ramon, CA (US); Guangxin Liu, San Ramon, CA (US); Chi Kit Lo, Danville, CA (US); Jerry M. Kupsh, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 798 days.

(21) Appl. No.: 14/057,584

(22) Filed: Oct. 18, 2013

(65) Prior Publication Data

US 2015/0110088 A1 Apr. 23, 2015

(51) Int. Cl.
*H04W 4/12* (2009.01)
*H04W 56/00* (2009.01)

(52) U.S. Cl.
CPC .......... *H04W 4/12* (2013.01); *H04W 56/001* (2013.01)

(58) Field of Classification Search
None
See application file for complete search history.

(56) References Cited

U.S. PATENT DOCUMENTS

2007/0255853 A1* 11/2007 Toutonghi ........... H04L 12/5835
709/246
2012/0231770 A1* 9/2012 Clarke ................ H04L 12/5885
455/414.1

* cited by examiner

*Primary Examiner* — Hassan Phillips
*Assistant Examiner* — Omeed D Rahgozar

(57) ABSTRACT

A device may receive a text message or a multimedia message to be received by a receiving device. The message may be stored by one or more storage devices. The device may determine that the message is to be received by the receiving device via a wireless local area network (WLAN). The device may send, to the receiving device, a notification associated with the message. The device may identify a storage device, of the one or more storage devices, to provide the message to the receiving device. The device may manage a synchronization between the receiving device and the storage device via the WLAN. The synchronization may cause the message to be received by the receiving device. The device may receive an indication that the receiving device has received the message, and may provide closure information. The closure information may prevent the message from being delivered via a cellular network.

20 Claims, 12 Drawing Sheets

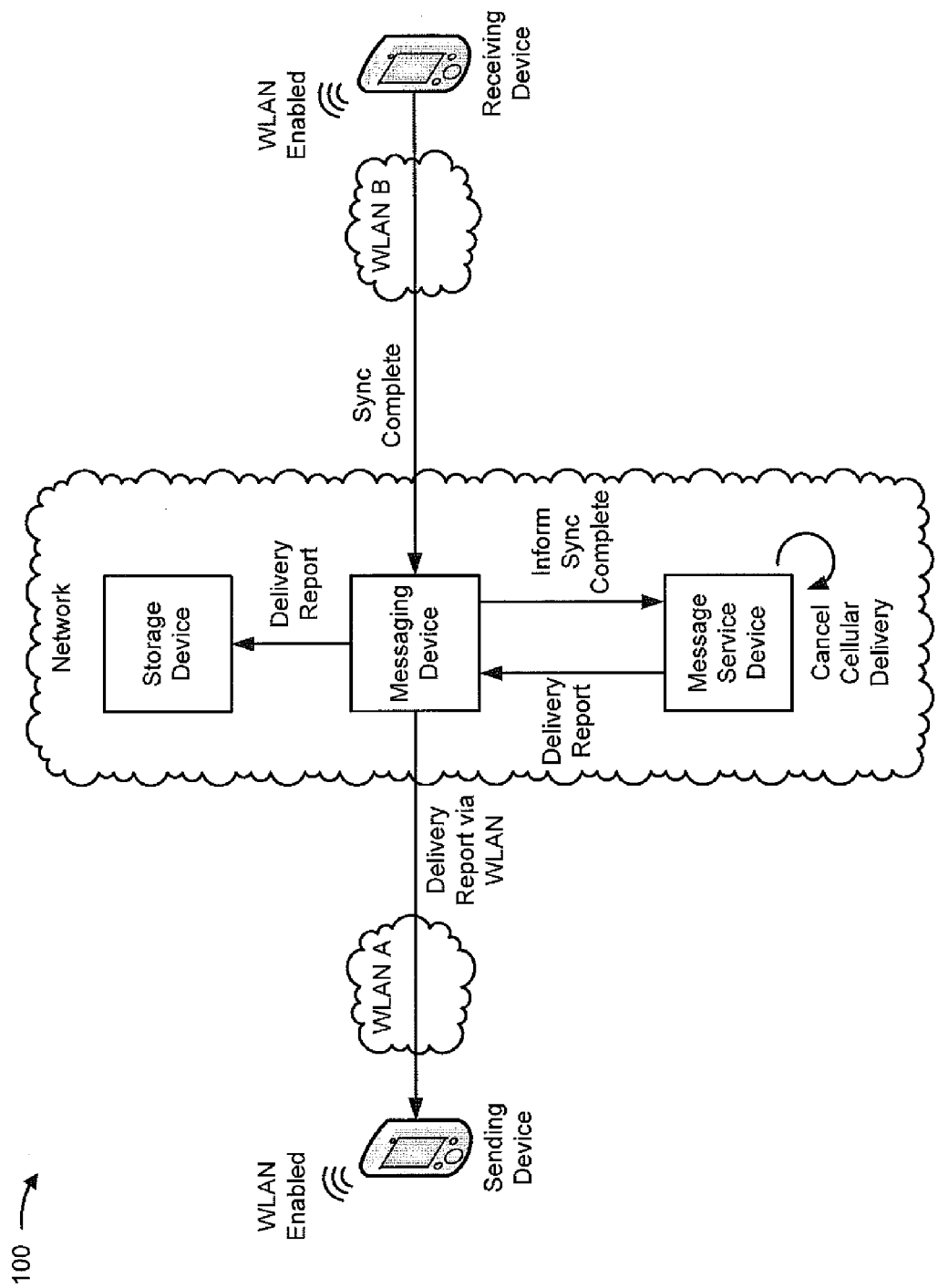

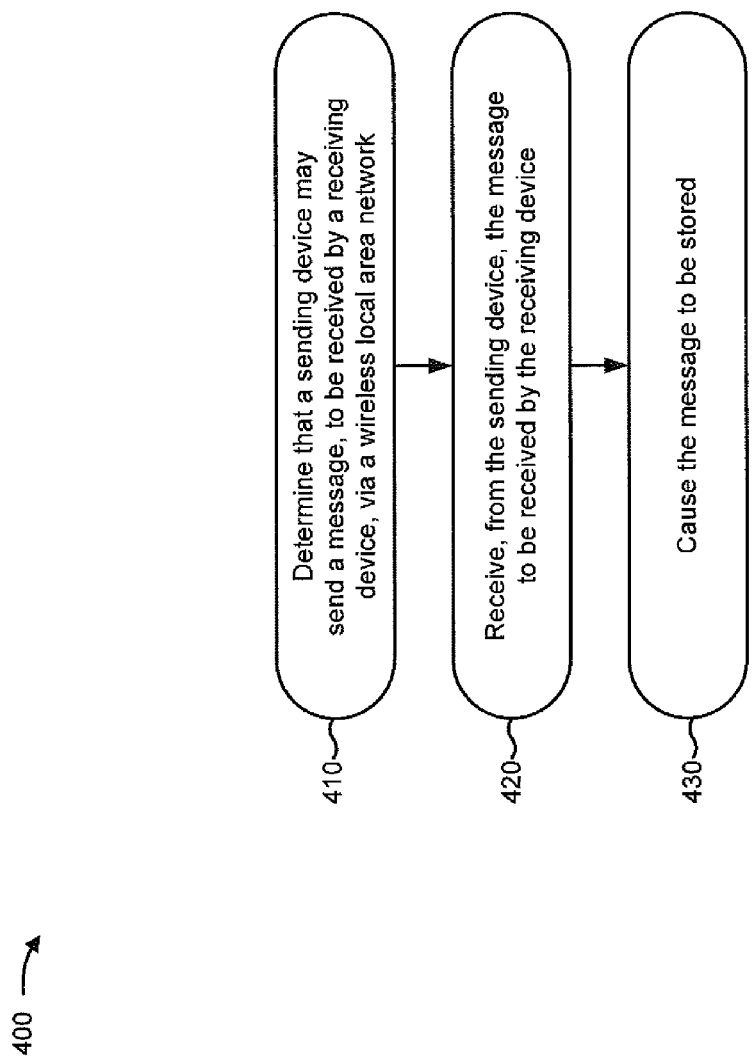

SENDING AND RECEIVING MESSAGES OVER WIRELESS LOCAL AREA NETWORKS

BACKGROUND

A mobile device may be capable of sending another device (e.g., another mobile device) a message via a cellular network (e.g., a second generation ("2G") network, a third generation ("3G") network, a fourth generation ("4G") network, etc.). The message may be in the form of a text message (e.g., a short message service ("SMS") message), a multimedia message (e.g., a multimedia messaging service ("MMS") message), or another type of message.

BRIEF DESCRIPTION OF THE DRAWINGS

FIGS. 1A and 1B are diagrams of an overview of an example implementation described herein;

FIG. 4 is a flow chart of an example process for receiving and storing a message to be delivered to a receiving device;

DETAILED DESCRIPTION OF PREFERRED EMBODIMENTS

The following detailed description of example implementations refers to the accompanying drawings. The same reference numbers in different drawings may identify the same or similar elements.

A user, associated with a sending device, may wish to send a message (e.g., an SMS message, an MMS message, etc.) to another user, associated with a receiving device. Generally, the sending device may send the message via a cellular network (e.g., a 2G network, a 3G network, a 4G network, etc.), and the receiving device may receive the message via the cellular network and/or another cellular network. However, the sending device may be unable to send the message via the cellular network, and/or the receiving device may be unable to receive the message via the cellular network (e.g., when there is a weak cellular signal, when there is no cellular signal, when the cellular network is congested, when the sending device and/or the receiving device is roaming, etc.). As such, the sending device and/or the receiving device may wish to send and/or receive the message via another network that the sending device and/or the receiving device be capable of communicating with, such as a wireless local area network ("WLAN") (e.g., a WiFi network or the like). Implementations described herein may allow a sending device to send a message to a receiving device via a WLAN, and may allow the receiving device to receive the message via a WLAN (e.g., rather than sending and/or receiving the message via a cellular network).

Figure 1A:
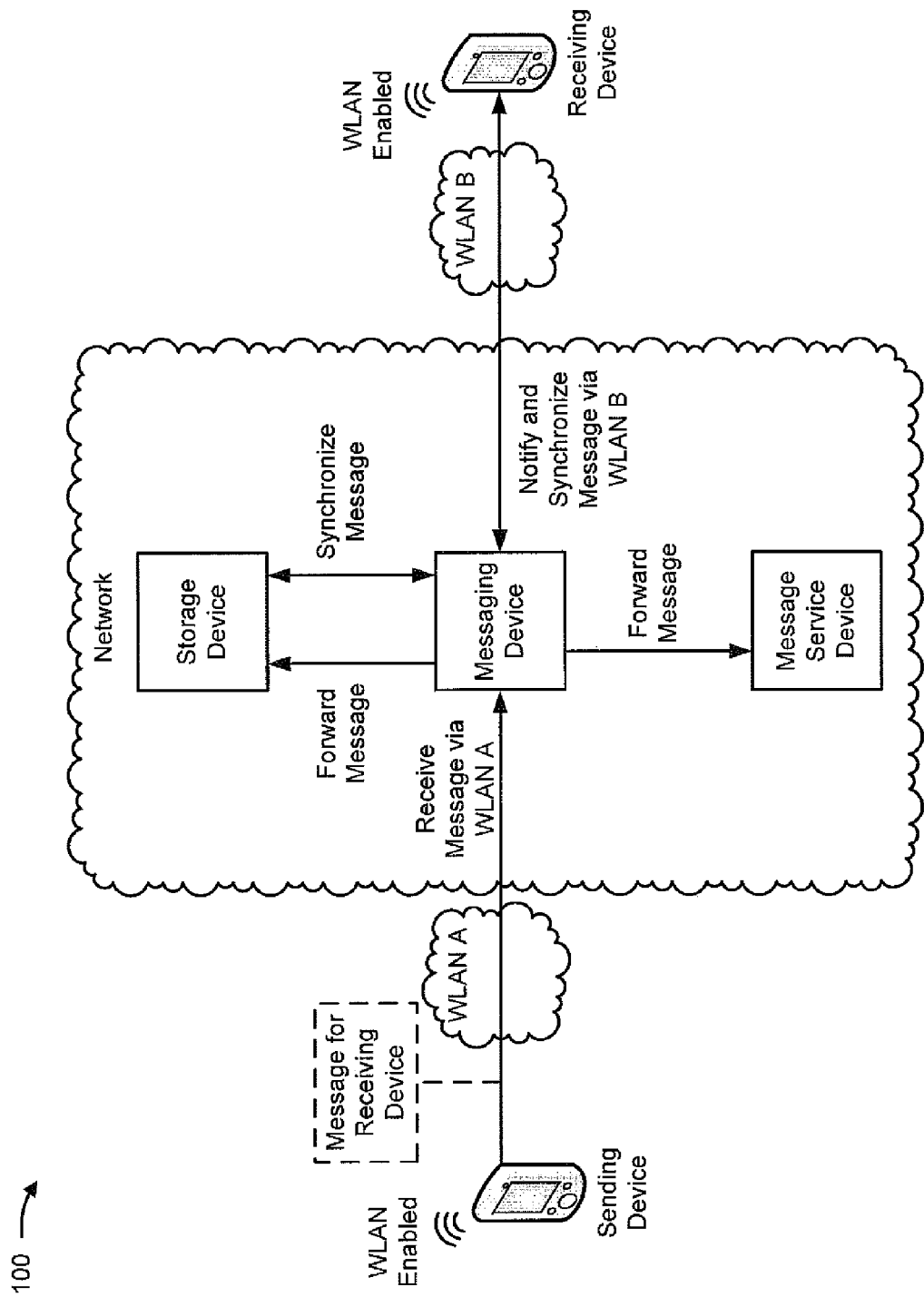

FIGS. 1A and 1B are diagrams of an overview of an example implementation 100 described herein. For the purposes of FIGS. 1A and 1B, assume that a sending device is attempting to send a message to a receiving device via a service provider network (e.g., a network associated with providing messaging services). Further, assume that the sending device is connected to WLAN A (e.g., the sending device is enabled to send the message via WLAN A), and that the receiving device is connected to WLAN B (e.g., the receiving device is enabled to receive the message via WLAN B).

As shown in FIG. 1A, the sending device may send the message to the network via WLAN A. As shown, a messaging device (e.g., a device associated with handling messages sent and/or received via a WLAN) may receive, via WLAN A, the message from the sending device. As further shown, the messaging device may forward the message to a message service device (e.g., a device associated with handling messages sent and/or received via a cellular network) and a storage device (e.g., a device associated with storing messages to be received by the receiving device). As shown, the messaging device may notify (e.g., by sending a push notification) the receiving device that the messaging device has received the message intended for the receiving device. As further shown, the messaging device may manage a synchronization between the receiving device, the messaging device, and/or the storage device, which may result in the receiving device receiving the message via WLAN B (e.g., since the receiving device is WLAN enabled).

As shown in FIG. 1B, the receiving device may notify the messaging device that synchronization (e.g., between the receiving device and the messaging device and/or the storage device) is complete. As shown, the messaging device may inform the message service device that the synchronization is complete (e.g., the message has been delivered via WLAN B), and the message service device may cancel an attempt to deliver the message via a cellular network (e.g., since the message has already been delivered via WLAN B). As further shown, the message service device may send, to the messaging device, a delivery report associated with the message, and the messaging device may forward the delivery report to the sending device (e.g., via WLAN A) and the storage device.

In this way, a sending device may send a message to a receiving device via a WLAN, and the receiving device may receive the message via a WLAN. This may allow the sending device and/or the receiving device to send and/or receive the message when the sending device and/or the receiving device is enabled to send and/or receive the message via a WLAN (e.g., when the sending device and/or receiving device is unable to send and/or receive the message via a cellular network, when the sending device and/or receiving device is roaming, when a user has specified that the message is to be sent and/or received via a WLAN). This may also allow a user (e.g., a user associated with the sending device, a user associated with the receiving device) to avoid messaging charges associated with sending and/or receiving messages (e.g., when the sending device and/or receiving device is roaming, etc.).

Figure 2:
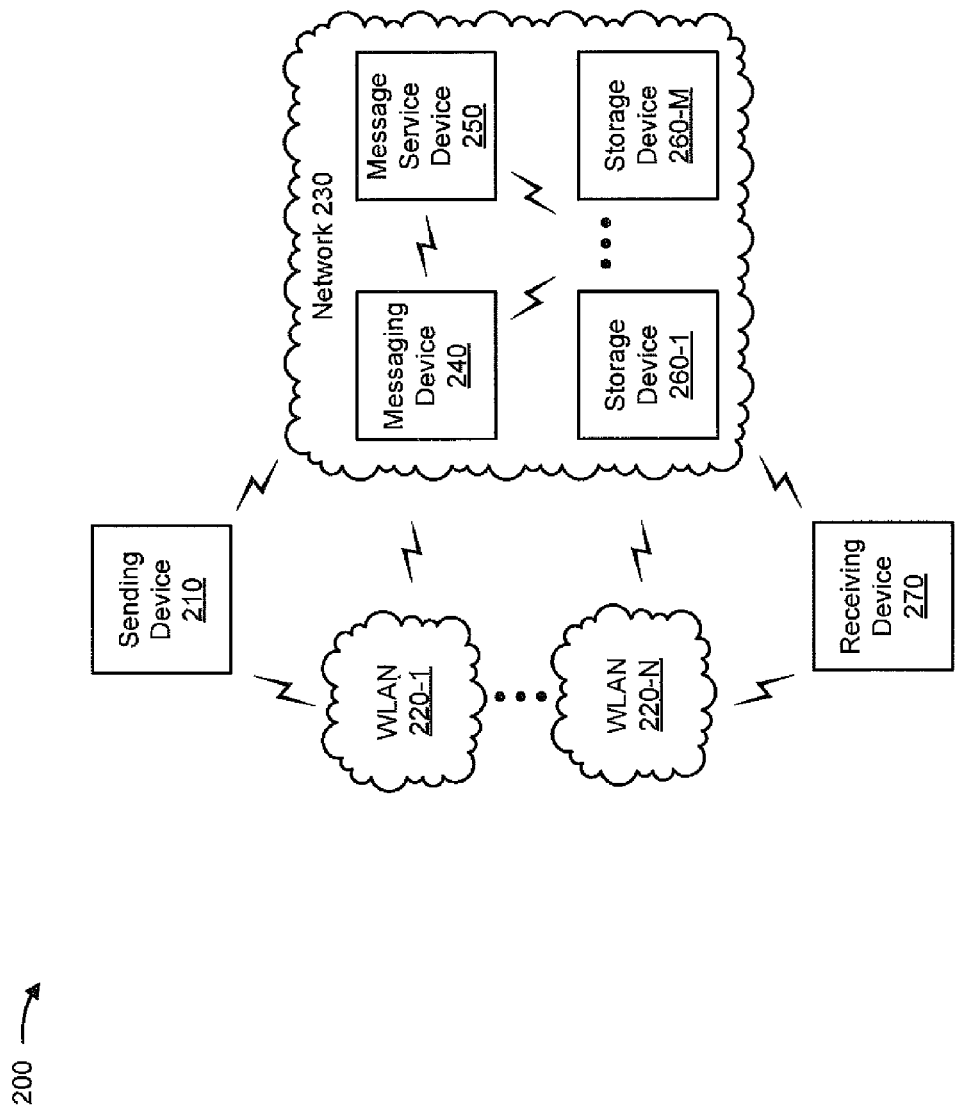
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a sending device 210, a set of WLANs 220-1 through 220-N (N>1) (hereinafter collectively referred to as "WLANs 220," and individually as "WLAN 220"), a network 230, a messaging device 240, a message service device 250, a set of storage devices 260-1 through 260-M (M>1)

(hereinafter collectively referred to as "storage devices 260," and individually as "storage device 260"), and a receiving device 270.

Sending device 210 may include one or more devices capable of communicating with another device via WLAN 220 and/or network 230. For example, sending device 210 may include a wireless communication device, such as a mobile phone, a personal digital assistant ("PDA"), a smart phone, and/or a similar device. In some implementations, sending device 210 may include a device capable of communicating with receiving device 270 (e.g., via an SMS message, via an MMS message, or another type of text message) via WLAN 220 and/or network 230. In some implementations, sending device 210 may store and/or transmit information associated with a message sent by sending device 210.

WLAN 220 may include one or more wireless local area networks (e.g., a WiFi network), a data network, or another similar type of network. In some implementations, WLAN 220 may allow sending device 210 and/or receiving device 270 to communicate with another device (e.g., messaging device 240, message service device 250, storage device 260, etc.) included in network 230. In some implementations, WLAN 220 may allow sending device 210 and/or receiving device 270 to send and/or receive a message via network 230. In some implementations, WLAN 220 may include one or more network devices that permit communication between WLAN 220 and network 230.

Network 230 may include one or more wired and/or wireless networks. For example, network 230 may include a cellular network, a public land mobile network ("PLMN"), a LAN, a WAN, a MAN, a telephone network (e.g., the Public Switched Telephone Network ("PSTN")), an ad hoc network, an intranet, the Internet, a fiber optic-based network, and/or a combination of these or other types of networks. In some implementations, network 230 may allow sending device 210 and/or receiving device 270 to communicate with another device (e.g., messaging device 240, message service device 250, storage device 260, etc.). In some implementations, network 220 may include messaging device 240, message service device 250, and/or storage device 260.

Messaging device 240 may include one or more devices capable of receiving, generating, processing, storing, and/or providing information associated with a message that may be sent and/or received via WLAN 220. For example, messaging device 240 may include a server or a collection of servers. In some implementations, messaging device 240 may be a device capable of communicating with sending device 210 and/or receiving device 260 via WLAN 220. In some implementations, messaging device 240 may be capable of coordinating, managing, handling, and/or synchronizing a delivery of a message to receiving device 270 via WLAN 220. Additionally, or alternatively, messaging device 240 may be capable of receiving a message from sending device 210 via WLAN 220. In some implementations, messaging device 240 may be capable of communicating with another device (e.g., message service device 250, storage device 260, etc.) included in network 230. In some implementations, messaging device 240 may be capable of storing and/or determining information that identifies storage device 260 associated with storing a message to be received by receiving device 270 (e.g., a domain name system ("DNS") server, etc.). In some implementations, messaging device 240 may be included in network 230.

Message service device 250 may include one or more devices capable of receiving, generating, processing, storing, and/or providing information associated with a message that may be sent and/or received via a cellular network. For example, message service device 250 may include a server or a collection of servers. In some implementations, message service device 250 may be a device capable of communicating with sending device 210 and/or receiving device 270 via a cellular network. In some implementations, message service device 250 may be capable of coordinating, managing, and/or handling a delivery of a message to receiving device 270 via a cellular network. Additionally, or alternatively, message service device 250 may be capable of receiving a message from sending device 210 via a cellular network. In some implementations, message service device 250 may be capable of communicating with another device (e.g., messaging device 240, storage device 260, etc.) included in network 230. In some implementations, message service device 250 may be included in network 230.

Storage device 260 may include one or more devices capable of receiving, storing, and/or providing information associated with a message. For example, storage device 260 may include a server or a collection of servers. In some implementations, storage device 260 may be a device capable of receiving information, associated with a message, from messaging device 240, and storing the information. Additionally, or alternatively, storage device 260 may be capable of providing the information, associated with the message, to messaging device 240 and/or another device. In some implementations, messaging device 240 may be capable of communicating with another device (e.g., messaging device 240, message service device 250, receiving device 270, etc.) included in network 230. In some implementations, storage device 260 may be included in network 230.

Receiving device 270 may include one or more devices capable of communicating with another device via WLAN 220 and/or network 230. For example, receiving device 270 may include a wireless communication device, such as a mobile phone, a personal digital assistant ("PDA"), a smart phone, and/or a similar device. In some implementations, receiving device 270 may include a device capable of communicating with sending device 210 (e.g., via an SMS message, via an MMS message, or another type of text message) via WLAN 220 and/or network 230. In some implementations, receiving device 270 may store and/or transmit information associated a message received by receiving device 270.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
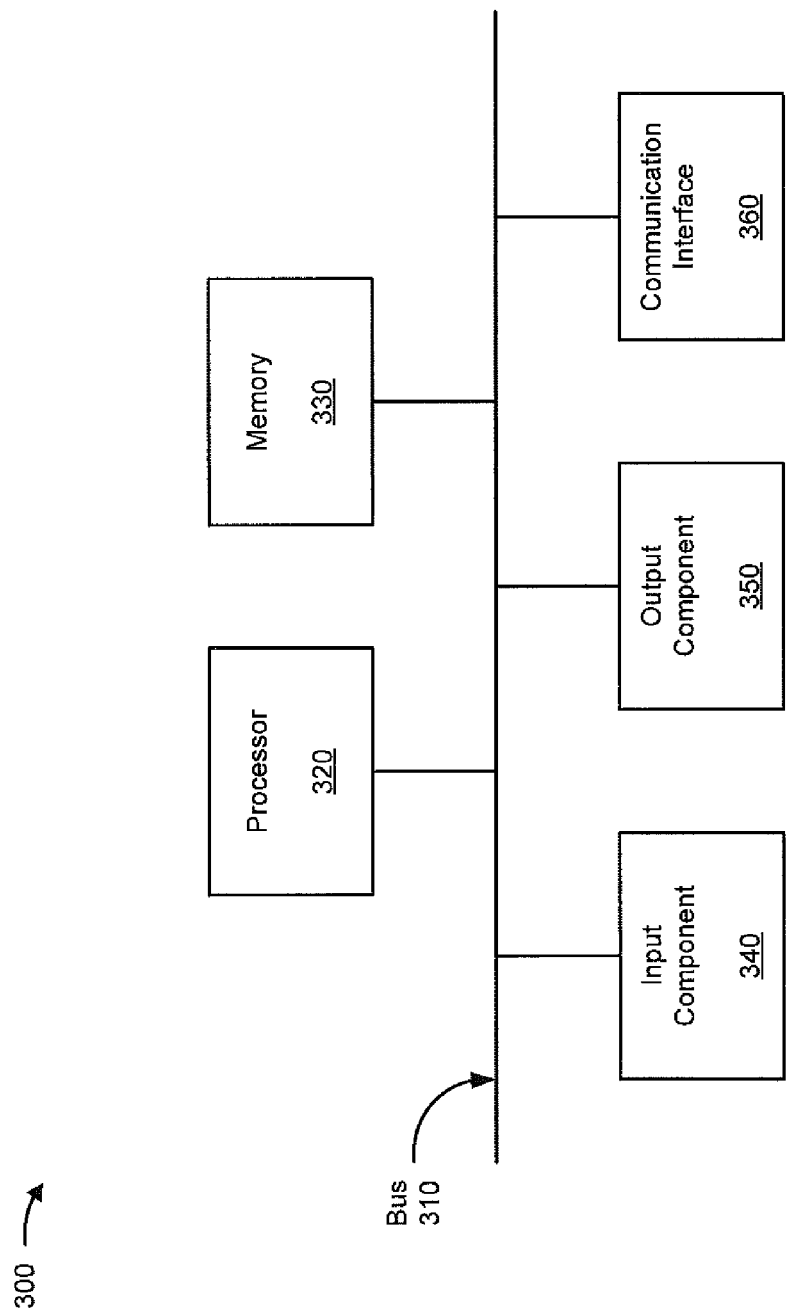
FIG. 3 is a diagram of example components of one or more devices of FIG. 2.

FIG. 3 is a diagram of example components of a device 300. Device 300 may correspond to sending device 210, messaging device 240, message service device 250, storage device 260, and/or receiving device 270. Additionally, or alternatively, each of sending device 210, messaging device 240, message service device 250, storage device 260, and/or receiving device 270 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.). Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIG. 4 is a flow chart of an example process 400 for receiving and storing a message to be delivered to a receiving device. In some implementations, one or more process blocks of FIG. 4 may be performed by messaging device 240. In some implementations, one or more process blocks of FIG. 4 may be performed by another device or a group of devices separate from or including messaging device 240, such as message service device 250 and/or storage device 260.

As shown in FIG. 4, process 400 may include determining that a sending device may send a message, to be received by a receiving device, via a wireless local area network (block 410). For example, messaging device 240 may determine that sending device 210 may send a message, to be received by receiving device 270, via WLAN 220. In some implementations, messaging device 240 may determine that sending device 210 may send a message via WLAN 220 when messaging device 240 receives, from sending device 210, information associated with sending a message via WLAN 220 (e.g., where sending device 210 attempts to send a message via WLAN 220). Additionally, or alternatively, sending device 240 may determine that sending device 210 may send the message via WLAN 220 when messaging device 240 receives information, indicating that sending device 210 may send the message via WLAN 220, from another device, such as sending device 210 (e.g., messaging device 240 may receive, from sending device 210, information indicating that sending device 210 is WLAN enabled, etc.).

In some implementations, messaging device 240 may determine that sending device 210 may send the message via WLAN 220 based on information stored by messaging device 240 and/or another device. For example, sending device 210 may provide, to messaging device 240, an indication that sending device 210 wishes to send a message, and messaging device 240 may determine (e.g., based on a sending device identifier associated with sending device 210) that sending device 210 may send the message via WLAN 220 based on information stored by messaging device 240 (e.g., information associated with the sending device identifier, indicating that sending device 210 may send the message via WLAN 220).

In some implementations, messaging device 240 may determine that sending device 210 may send the message via WLAN 220 based on an access process associated with sending device 210. The access process may include messaging device 240 verifying that sending device 210 may obtain access to messaging device 240 (e.g., when sending device 210 may log into messaging device 240). Additionally, the access process may include messaging device 240 determining that sending device 210 is able to send the message to messaging device 240 (e.g., when sending device 210 sends information indicating that sending device 210 is WLAN enabled). Additionally, the access process may include messaging device determining that sending device 210 is configured to send the message via WLAN 220 (e.g., sending device 210 may send information indicating that, based on user input, sending device 210 is configured to send messages via WLAN 220).

As shown in FIG. 4, process 400 may include receiving, from the sending device, the message to be received by the receiving device (block 420). For example, messaging device 240 may receive, from sending device 210 the message to be received by receiving device 270. In some implementations, messaging device 240 may receive the message from sending device 210 via WLAN 220 (e.g., where sending device 210 is connected to WLAN 220).

Additionally, or alternatively, messaging device 240 may receive the message from message service device 250. For example, sending device 210 may send the message to message service device 250 via a cellular network (e.g., where sending device 210 is not connected to WLAN 220), and message service device 250 may send the message to messaging device 240.

The message, received by messaging device 240, may include information, provided by sending device 210, that is to be delivered to receiving device 270. For example, the message may include information associated with a message identifier (e.g., a string of characters that identifies the message, a message identification number, etc.). Additionally, or alternatively, the message may include information indicating a device identifier associated with sending device 210 (e.g., a string of characters that identifies sending device 210, such as an international mobile subscriber identity ("IMSI"), a mobile subscriber integrated services digital network number ("MSISDN"), a mobile directory number ("MDN"), a telephone number, etc.). Additionally, or alternatively, the message may include information indicating a device identifier associated with receiving device 270 (e.g., a string of characters that identifies receiving device 220, such as an IMSI, an MSISDN, an MDN, a telephone number, etc.). Additionally, or alternatively, the message may include information associated with the content of the message (e.g., an image, a video, a string of text, etc.) In some implementations the message may be a text message, such as an SMS message, an MMS message, or the like.

As further shown in FIG. 4, process 400 may include causing the message to be stored (block 430). For example, messaging device 240 may cause the message, to be received by receiving device 270, to be stored by storage device 260. In some implementations, messaging device 240 may cause the message to be stored by providing the message to storage device 260.

In some implementations, messaging device 240 may cause the message to be stored by storage device 260 based on information associated with the message. For example, the message may include information (e.g., an MDN, a telephone number, etc.) that identifies receiving device 270, and messaging device 240 may cause the message to be stored by storage device 260 based on the information that identifies receiving device 270 (e.g., when a particular storage device 260 is configured to store messages associated with a particular area code included in an MDN that identifies receiving device 270, when a particular storage device 260 is configured to store messages associated with receiving device 270 or a set of receiving devices 270, etc.).

In some implementations, messaging device 240 may cause the message to be stored by one or more storage devices 260. For example, messaging device 240 may provide the message to a first storage device 260 (e.g., a primary storage device), may provide the message to a second storage device 260 (e.g., a secondary storage device), and both the first storage device 260 and the second storage device 260 may store the message (e.g., when the secondary storage device is configured to assume the role of the primary storage device in the event that the primary storage device is unable to provide the message to receiving device 270).

In some implementations, messaging device 240 may cause the message, to be delivered to receiving device 270, to be stored by message service device 250 (e.g., when messaging device 240 receives the message from sending device 210 via WLAN 220). In some implementations, messaging device 240 may cause the message to be stored by providing the message to message service device 250 (e.g., message service device 250 may be associated with attempting to deliver the message via a cellular network and may temporarily store the message while message service device 250 attempts to deliver the message via the cellular network).

In some implementations, messaging device 240 may cause the message to be stored by both storage devices 260 and message service device 250. For example, messaging device 240 may receive the message via WLAN 220, may provide the message to both storage device 260 and message service device 250, and both storage devices 260 and message service device 250 may store the message. Additionally, or alternatively, messaging device 240 may cause the message to be stored by messaging device 240.

In some implementations, messaging device 240, message service device 250, and/or storage device 260 may store information associated with the message, such as a message identifier (e.g., a string of characters associated with the message, a message identification number, etc.) that identifies the message. In some implementations, messaging device 240, message service device 250, and/or storage device 260 may store the message in a memory location (e.g., a RAM, a hard disk, etc.) of messaging device 240, message service device 250, and/or storage device 260, and messaging device 240, message service device 250, and/or storage device 260 may store an indication that the message is associated with sending device 210 and/or receiving device 270.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
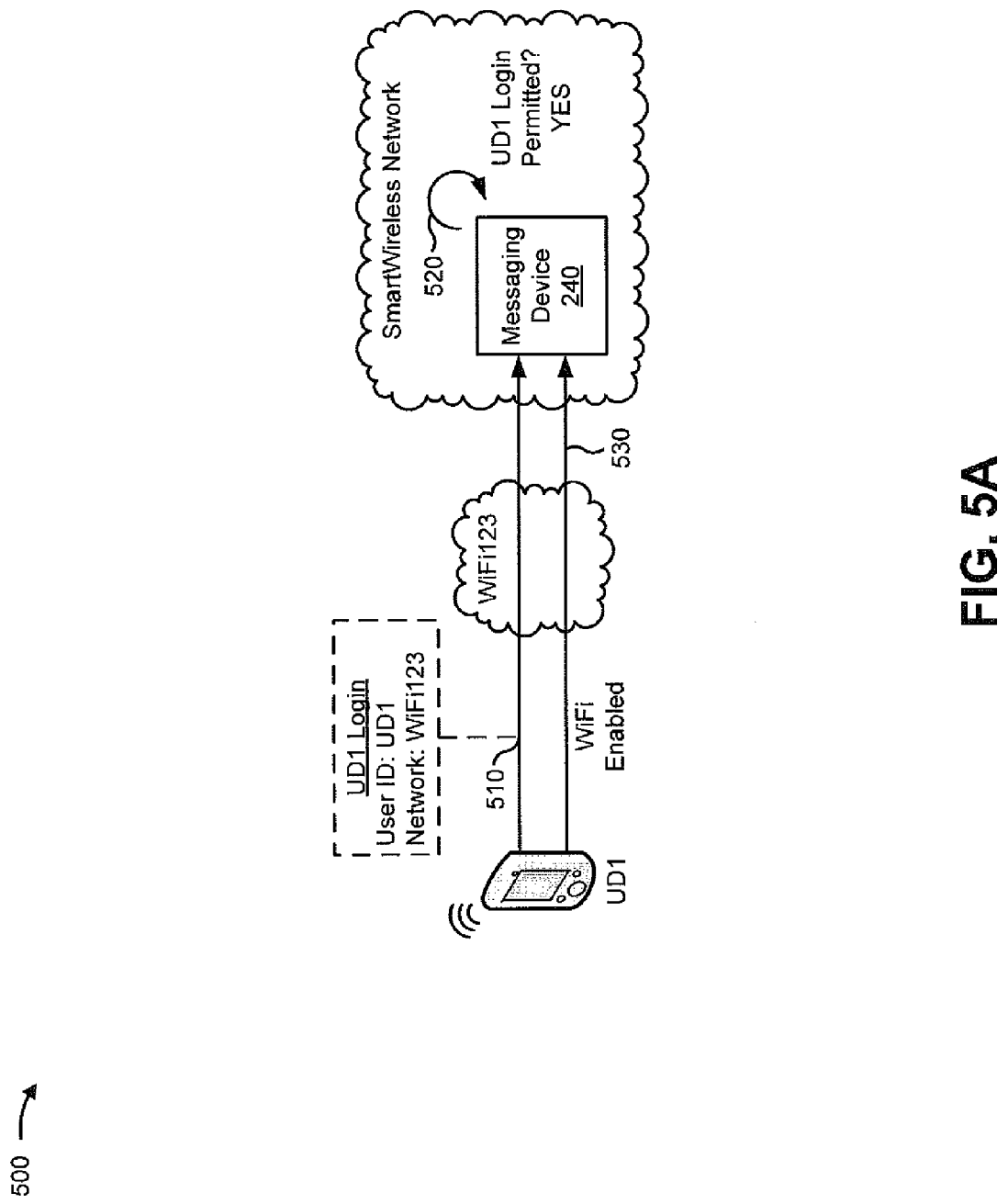
FIGS. 5A and 5B are diagrams of an example implementation relating to the example process shown in FIG. 4.
Figure 5B:
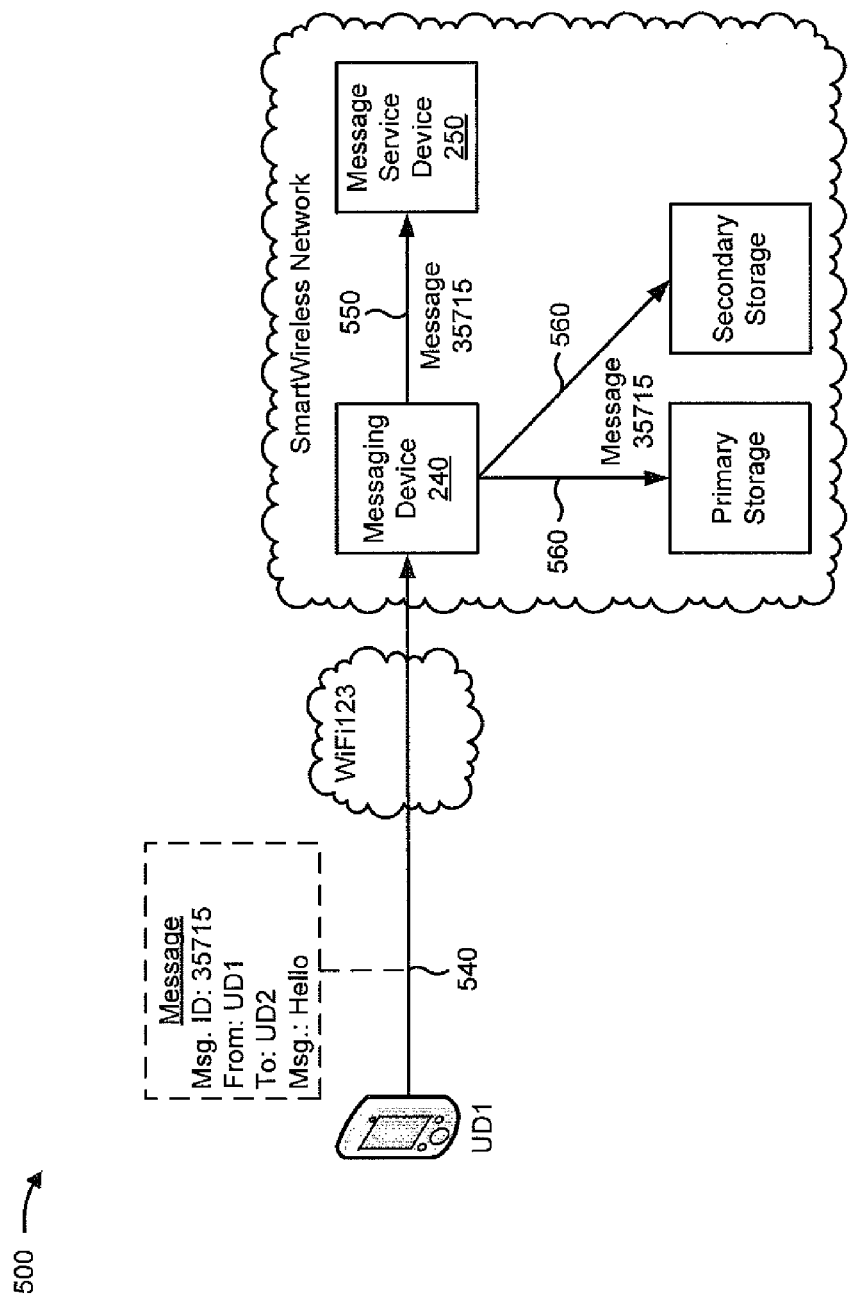

FIGS. 5A and 5B are diagrams of an example implementation 500 relating to example process 400 shown in FIG. 4. For the purposes of example implementation 500, assume that a sending device, UD1, wishes to send a message to a receiving device, UD2, via a WiFi network, WiFi 123. Further, assume that the message is to be delivered via a service provider network, identified as SmartWireless network.

As shown in FIG. 5A, and by reference number 510, UD1 may log into messaging device 240 (e.g., via the WiFi123 network) by sending login information to messaging device 240. As shown, UD1 may provide information identifying UD1 (e.g., "User ID: UD1), information, and information identifying the WiFi network (e.g., "WiFi123").

As shown by reference number 520, messaging device 240 may receive the login information, and may determine (e.g., based on information, stored by messaging device 240) that UD1 may send the message via messaging device 240. As shown by reference number 530, UD1 may also send, to messaging device 240, information indicating that UD1 is WiFi enabled (e.g., that UD1 is configured to send the message via the WiFi 123 network).

As shown in FIG. 5B, and by reference number 540, UD1 may send the message to messaging device 240 via the WiFi123 network. As shown, the message may include a message identifier (e.g., "35715"), a sending device identifier (e.g., "UD1"), a receiving device identifier ("UD2"), and the contents of the message (e.g., "Hello"). As shown by reference number 550, messaging device 240 may receive the message, and may cause the message to be stored by message service device 250 (e.g., message service device 250 may attempt to deliver the message via a cellular network when messaging device 240 is unable to provide the message to UD2 via a WLAN). As shown by reference number 560, messaging device 240 may also cause the message to be stored by a primary storage device and a secondary storage device (e.g., the primary storage device and the secondary storage device may store the message, and messaging device 240 may fetch the message from the primary storage device or the secondary storage device when messaging device 240 is able to provide the message to UD2 via a WLAN).

As indicated above, FIGS. 5A and 5B are provided merely as an example. Other examples are possible and may differ from what was described with regard to FIGS. 5A and 5B.

Figure 6:
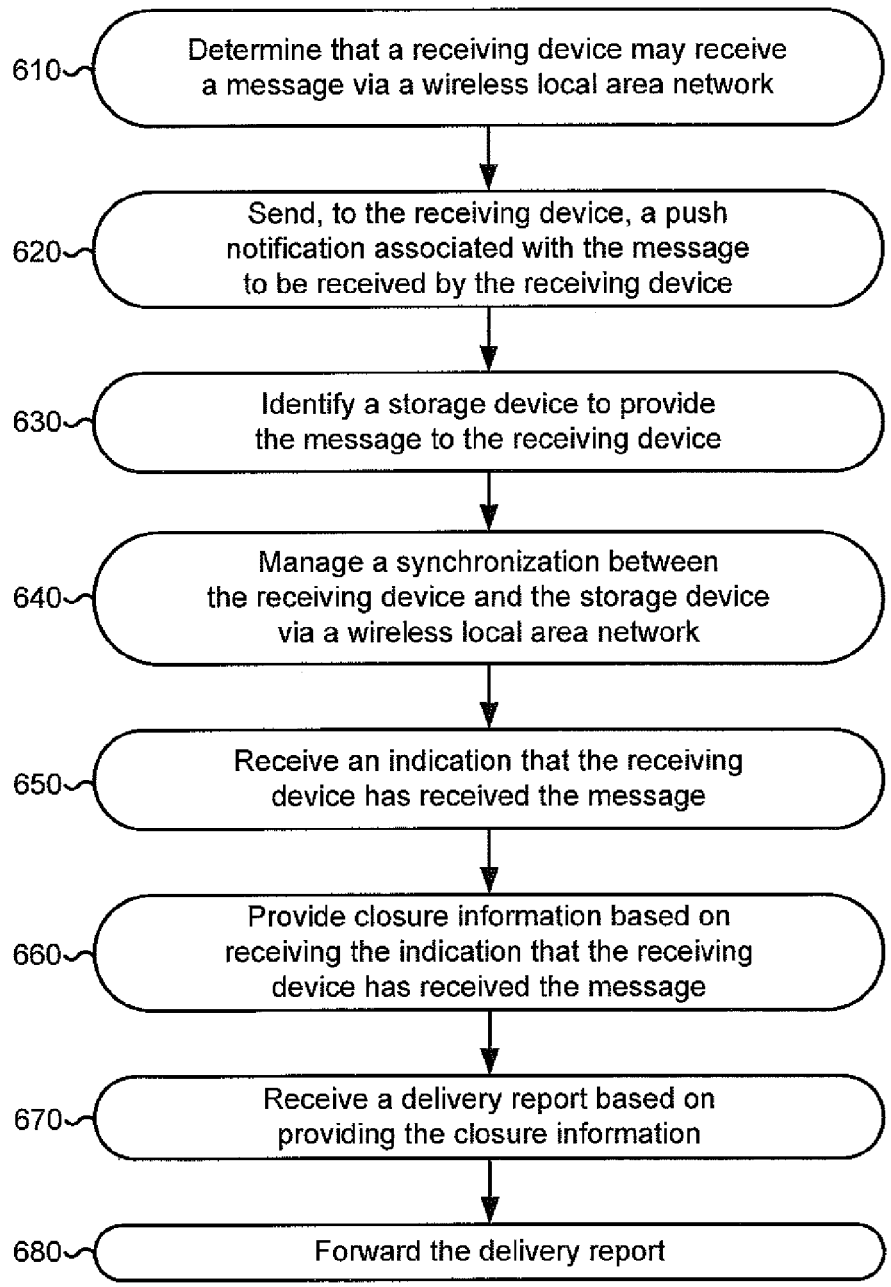
FIG. 6 is a flow chart of an example process for managing a synchronization between a receiving device and a storage device, via a wireless local area network, to provide a message to the receiving device, and forward a delivery report associated with the message.

FIG. 6 is a flow chart of an example process 600 for managing a synchronization between a receiving device and a storage device, via a wireless local area network, to provide a message to the receiving device, and forward a delivery report associated with the message. In some implementations, one or more process blocks of FIG. 6 may be performed by messaging device 240. In some implementations, one or more process blocks of FIG. 6 may be performed by another device or a group of devices separate from or including messaging device 240, such as message service device 250 and/or storage device 260.

As shown in FIG. 6, process 600 may include determining that a receiving device may receive a message via a wireless local area network (block 610). For example, messaging device 240 may determine that receiving device 270 may receive a message via WLAN 220. In some implementations, messaging device 240 may determine that receiving device 270 may receive a message via WLAN 220 when messaging device 240 receives, from receiving device 270, information associated with receiving a message via WLAN 220. Additionally, or alternatively, sending device 240 may determine that receiving device 270 may receive the message via WLAN 220 when messaging device 240 receives information, indicating that receiving device 270 may receive the message via WLAN 220, from another device, such as receiving device 270 (e.g., messaging device 240 may receive, from receiving device 270, information indicating that receiving device 270 is WLAN enabled, etc.).

In some implementations, messaging device 240 may determine that receiving device 270 may receive the message via WLAN 220 based on information stored by messaging device 240 and/or another device. For example, receiving device 270 may provide, to messaging device 240, an indication that receiving device 270 wishes to receive a message, and messaging device 240 may determine (e.g., based on a receiving device identifier associated with receiving device 270) that receiving device 270 may receive the message via WLAN 220 based on information stored by messaging device 240 (e.g., information associated with the receiving device identifier, indicating that receiving device 270 may receive the message via WLAN 220).

In some implementations, messaging device 240 may determine that receiving device 270 may receive the message via WLAN 220 based on an access process associated with receiving device 270. The access process may include messaging device 240 verifying that receiving device 270 may obtain access to messaging device 240 (e.g., where receiving device 270 may log into messaging device 240). Additionally, or alternatively, the access process may include messaging device 240 determining that receiving device 270 is able to receive the message from messaging device 240 (e.g., receiving device 270 may send information indicating that receiving device 270 is WLAN enabled). Additionally, or alternatively, the access process may include messaging device 240 determining that receiving device 270 is configured to receive the message via WLAN 220 (e.g., receiving device 270 may send information indicating that, based on user input, receiving device 270 is configured to receive messages via WLAN 220).

As further shown in FIG. 6, process 600 may include sending, to the receiving device, a push notification associated with the message to be received by the receiving device (block 620). For example, messaging device 240 may send, to receiving device 270, a push notification (e.g., an indication that messaging device 240 has received the message intended for receiving device 270) associated with a message to be received by receiving device 270. In some implementations, messaging device 240 may send the push notification when messaging device 240 receives the message from another device (e.g., sending device 210, message service device 250, etc.). Additionally, or alternatively, messaging device 240 may send the push notification to receiving device 270 when messaging device 240 receives (e.g., from receiving device 270 via WLAN 220) information indicating that receiving device 270 is able to receive the message via WLAN 220 (e.g., when receiving device 270 sends, to messaging device 240, information indicating that receiving device 270 is WLAN enabled).

In some implementations, the push notification may include information associated with the message, and may include information indicating that messaging device 240 has received the message. For example, the notification may include a message identifier associated with the message, a sending device identifier, a receiving device identifier, and/or information indicating that messaging device 240 has received the message (e.g., that messaging device 240 is able to deliver the message to receiving device 270).

As further shown in FIG. 6, process 600 may include identifying a storage device to provide the message to the receiving device (block 630). For example, messaging device 240 may identify storage device 260 to provide the message to receiving device 270. In some implementations, messaging device 240 may identify storage device 260 when messaging device 240 sends, to receiving device 270, the push notification associated with the message (e.g., after receiving device 270 has received the push notification). Additionally, or alternatively, messaging device 240 may identify storage device 260 when messaging device 240 receives information from another device (e.g., receiving device 270).

In some implementations, messaging device 240 may identify storage device 260 based on information associated with receiving device 270. For example, receiving device 270 may provide information (e.g., an MDN, an area code, a domain name, a network address, etc.) associated with receiving device 270, and messaging device 240 may identify (e.g., based on information stored by messaging device 240) a particular storage device 260 based on the information provided by receiving device 270 (e.g., when receiving device provides a domain name including a specific area code, messaging device 240 may identify a particular storage device 260 associated with storing messages associated with the area code).

In some implementations, messaging device 240 may identify storage device 260 based on information stored by messaging device 240. For example, receiving device 270 may provide a first DNS query that includes a first domain name (e.g., a domain name that is dynamically generated by receiving device 270 based on an area code associated with receiving device 270), and messaging device 240 may map the first domain name to a second domain name based on information stored (e.g., in a data structure) by messaging device 240. Messaging device 240 may provide the second domain name to receiving device 270, receiving device 270 may provide a second DNS query that includes the second domain name, and messaging device 240 may map the second domain name to one or more storage devices 260 associated with storing the message (e.g., the one or more storage devices 260 may store messages associated with the area code of receiving device 270).

Additionally, or alternatively, a storage device 260 that stores messages (e.g., associated with a particular area code) may be changed to another storage device 260 by modifying information (e.g., the second domain name) stored by messaging device 240 without requiring an update to receiving device 270 (e.g., since messaging device 240 may map the first domain name, including the area code, to the second domain name, and the second domain name will map to the other storage device 260, only information stored by messaging device 240, associated with the second domain name, needs to be modified). For example, a first storage device 260, that stores messages associated with an area code, may discontinue storing messages associated with the area code (e.g., due to lack of capacity, etc.). In this example, the second domain name, stored by messaging device 240, may be modified to identify a second storage device 260 (e.g., a storage device 260 that is to take over storing messages associated with the area code), and messaging device 240 will map the first domain name to the modified second domain name (e.g., without requiring an update to the first domain name generated by receiving device 270).

Additionally, or alternatively, messaging device 240 may identify storage device 260 based on information associated with one or more storage devices 260. For example, the message may be stored by a primary storage device 260 and a secondary storage device 260 associated with receiving device 270 (e.g., when both the primary storage device 260 and the secondary storage device 260 store messages associated with the area code of receiving device 270), and messaging device 240 may determine the health of primary storage device 260 and secondary storage device 260 (e.g., whether primary storage device 260 and/or secondary storage device 260 is capable of synchronizing with receiving device 270, etc.). In this example, if primary storage device 260 is healthy, then messaging device 240 may identify primary storage device 260 (e.g., since receiving device 270 may synchronize with primary storage device 260). Alternatively, if primary storage device 260 is unhealthy (e.g., when primary storage device 260 is offline, damaged, or otherwise unable to synchronize with receiving device 270) and secondary storage device 260 is healthy, then messaging device 240 may identify secondary storage device 260 (e.g., since receiving device 270 may synchronize with secondary storage device 260).

In some implementations, messaging device 240 may provide information that identifies storage device 260 (e.g., a network address, an internet protocol ("IP") address, etc.) to receiving device 270 via WLAN 220.

As further shown in FIG. 6, process 600 may include managing a synchronization, between the receiving device and the storage device via a wireless local area network (block 640). For example, messaging device 240 may manage a synchronization, between receiving device 270 and storage device 260 via WLAN 220. In some implementations, messaging device 240 may manage the synchronization when messaging device 240 identifies storage device 260 that may provide the message to receiving device 270. Additionally, or alternatively, messaging device 240 may manage the synchronization when messaging device 240 receives, from receiving device 270, an indication that receiving device 270 wishes to synchronize with storage device 260 via WLAN 220.

In some implementations, the synchronization may be between receiving device 270 and storage device 260 (e.g., storage device 260 identified by messaging device 240) via messaging device 240 and/or WLAN 220. In some implementations, the synchronization may include messaging device 240 and/or storage device 260 determining that receiving device 270 has not received the message. For example, receiving device 270 may send, to messaging device 240 and/or storage device 260, one or more message identifiers, associated with one or more messages that have been received by receiving device 270, and messaging device 240 and/or storage device 260 may determine (e.g., based on the message identifiers received from receiving device 270) that the message has not been received by receiving device 270 (e.g., based on a message identifier, associated with the message, stored by messaging device 240 and/or storage device 260).

Additionally, or alternatively, the synchronization may include messaging device 240 fetching the message from storage device 260 based on determining that receiving device has not received the message. For example, messaging device 240 and/or storage device 260 may determine that the message is to be received by receiving device 270 (e.g., that receiving device 270 has not yet received the message), and messaging device 240 may fetch the message from storage device 260 and/or a memory location associated with messaging device 240.

Additionally, or alternatively, the synchronization (e.g., between storage device 260 and receiving device 270) may include messaging device 240 and/or storage device 260 providing the message to receiving device 270 via WLAN 220. In some implementations, messaging device 240 and/or storage device 260 may provide the message to receiving device 270 via WLAN 220 by sending information associated with the message to receiving device 270. For example, messaging device 240 may send, via WLAN 220 the message identifier associated with the message, the sending device identifier associated with the message, the receiving device identifier associated with the message, the content of the message (e.g., a picture, a video, a string of text, etc.), or the like.

In some implementations, receiving device 270 may receive the message via a cellular network after receiving device 270 has received the message via WLAN 220, may detect that receiving device 270 has already received the message (e.g., that the message received via the cellular network is a duplicate message), and may not notify a user, associated with receiving device 270, that receiving device 270 has received the duplicate message (e.g., to prevent the user from being alerted multiple times regarding the same message).

As further shown in FIG. 6, process 600 may include receiving an indication that the receiving device has received the message (block 650). For example, messaging device 240 may receive, from receiving device 270, an indication that receiving device 270 has received the message via WLAN 220. In some implementations, messaging device 240 may receive the indication from receiving device 270 when receiving device 270 sends the indication (e.g., after storage device 260 has synchronized with receiving device 270).

In some implementations, the indication may include information indicating that the message has been received by receiving device 270 via WLAN 220. For example, storage device 260 may synchronize with receiving device 270, receiving device 270 may receive the message, and receiving device 270 may send an indication to messaging device 240 indicating that the synchronization (e.g., between storage device 260 and receiving device 270) is complete As further shown in FIG. 6, process 600 may include providing closure information based on receiving the indication that the receiving device has received the message (block 660). For example, messaging device 240 may provide closure information, associated with the message, based on receiving the indication that receiving device 270 has received the message. In some implementations, messaging device 240 may provide the closure information when messaging device 240 receives the indication (e.g., indicating that the synchronization is complete) from receiving device 270. Additionally, or alternatively, messaging device 240 may provide the closure information when messaging device 240 receives, from another device (e.g., message service device 250, etc.), information indicating that messaging device 240 may provide the closure information.

In some implementations, the closure information may include information associated with a message detail record that is to be provided to another device (e.g., sending device 210, message service device 250, storage device 260, a billing device, etc.). Additionally, or alternatively, the closure information may include information indicating that delivery of the message by another device (e.g., message service device 250) is to be cancelled (e.g., message service device 250 may no longer attempt to deliver the message via a cellular network). For example, the closure information may include information indicating that the message was received by receiving device 270 via WLAN 220, and that message service device 250 is not to attempt to deliver the message via a cellular network (e.g., since receiving device 270 has already received the message).

In some implementations, messaging device 240 may provide the closure information to message service device 250. For example, messaging device 240 may provide the closure information (e.g., indicating that the message has been received by receiving device 270) to message service device 250, and message service device 250 may cancel an attempt (e.g., a future attempt, an ongoing attempt) to deliver the message to receiving device 270 via a cellular network. In some implementations, message service device 250 may notify sending device 210 that the message has been delivered (e.g., where sending device 210 is not connected to WLAN 220).

As further shown in FIG. 6, process 600 may include receiving a delivery report based on providing the closure information (block 670). For example, messaging device 240 may receive a delivery report based on providing the closure information associated with the message received by receiving device 270. In some implementations, messaging device 240 may receive the delivery report from message service device 250. For example, messaging device 240 may provide the closure information to message service device 250, message service device 250 may generate the delivery report, and message service device 250 may provide the delivery report to messaging device 240.

In some implementations, the delivery report may include information associated with the message received by receiving device 270. For example, the delivery report may include information indicating that the message was received by receiving device 270, may include information indicating that the message was delivered via WLAN 220, and/or other information associated with receipt of the message by receiving device 270 (e.g., a date the message was received, a time the message was received, etc.).

As further shown in FIG. 6, process 600 may include forwarding the delivery report (block 680). For example, messaging device 240 may forward the delivery report. In some implementations, messaging device 240 may forward the delivery report to storage device 260. For example, messaging device 240 may forward the delivery report to storage device 260 and storage device 260 may store information associated with the delivery report (e.g., information associated with an updated message state indicating that the message has been received by receiving device 270).

In some implementations, messaging device 240 may forward the delivery report to sending device 210 via WLAN 220. For example, messaging device 240 may forward, via WLAN 220, the delivery report to sending device 210 to notify sending device 210 that the message was received by receiving device 270 via WLAN 220 (e.g., when sending device 210 is enabled to send and/or receive messages via WLAN 220).

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

FIGS. 7A-7D are diagrams of an example implementation 700 relating to example process 600 shown in FIG. 6. For the purposes of example implementation 700, assume that messaging device 240 has received a message (e.g., identified as message 35715), sent by a sending device, UD1, that is to be received by a receiving device, UD2, via a Smart-Wireless network. Further, assume that messaging device 240 has caused the message to be stored by a primary storage device and a secondary storage device based on an area code associated with UD2 (e.g., area code 925).

Figure 7A:
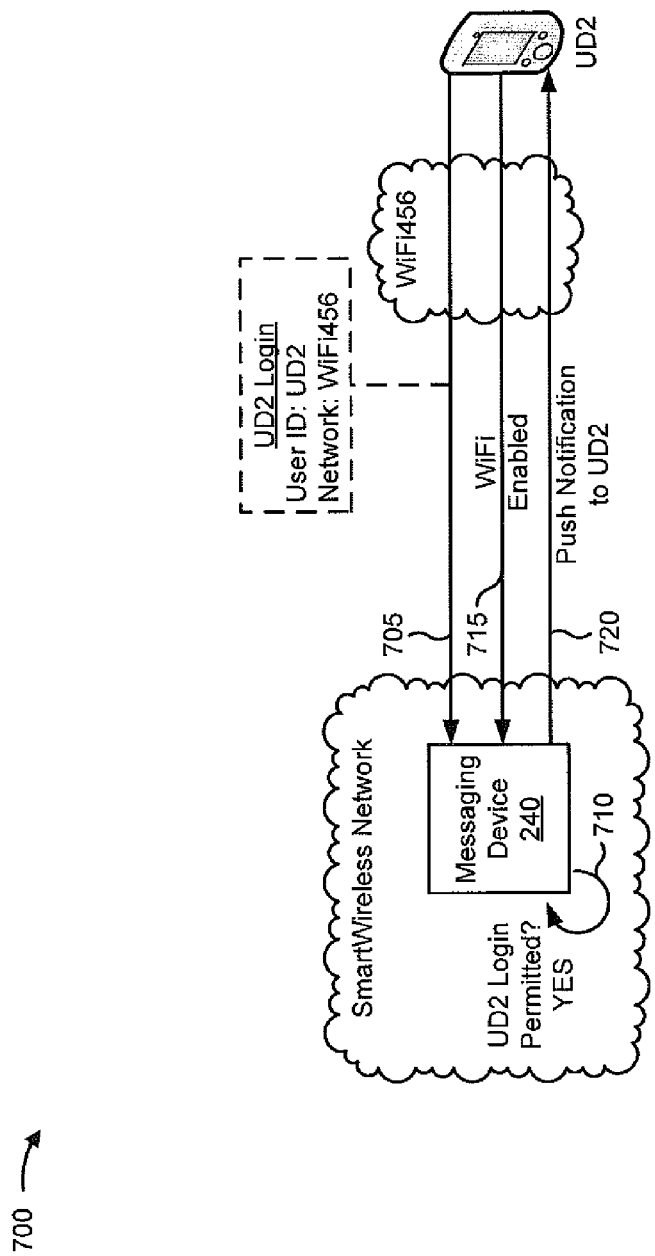
FIGS. 7A-7D are diagrams of an example implementation relating to the example process shown in FIG. 6.

As shown in FIG. 7A, and by reference number 705, UD2 may log into messaging device 240 (e.g., via the WiFi456 network), by sending login information to messaging device 240. As shown, UD2 may provide information identifying UD2 (e.g., "User ID: UD2), and information identifying the WiFi network (e.g., "WiFi456").

As shown by reference number 710, messaging device 240 may receive the login information, and may determine (e.g., based on information stored by messaging device 240) that UD2 may receive the message via messaging device 240. As shown by reference number 715, UD2 may also send, to messaging device 240, information indicating that UD2 is WiFi enabled (e.g., that UD2 is configured to receive the message via the WiFi456 network). As shown by reference number 720, messaging device 240 may send, via a WiFi456 network, a push notification indicating that messaging device 240 has received a message to be received by UD2.

Figure 7B:
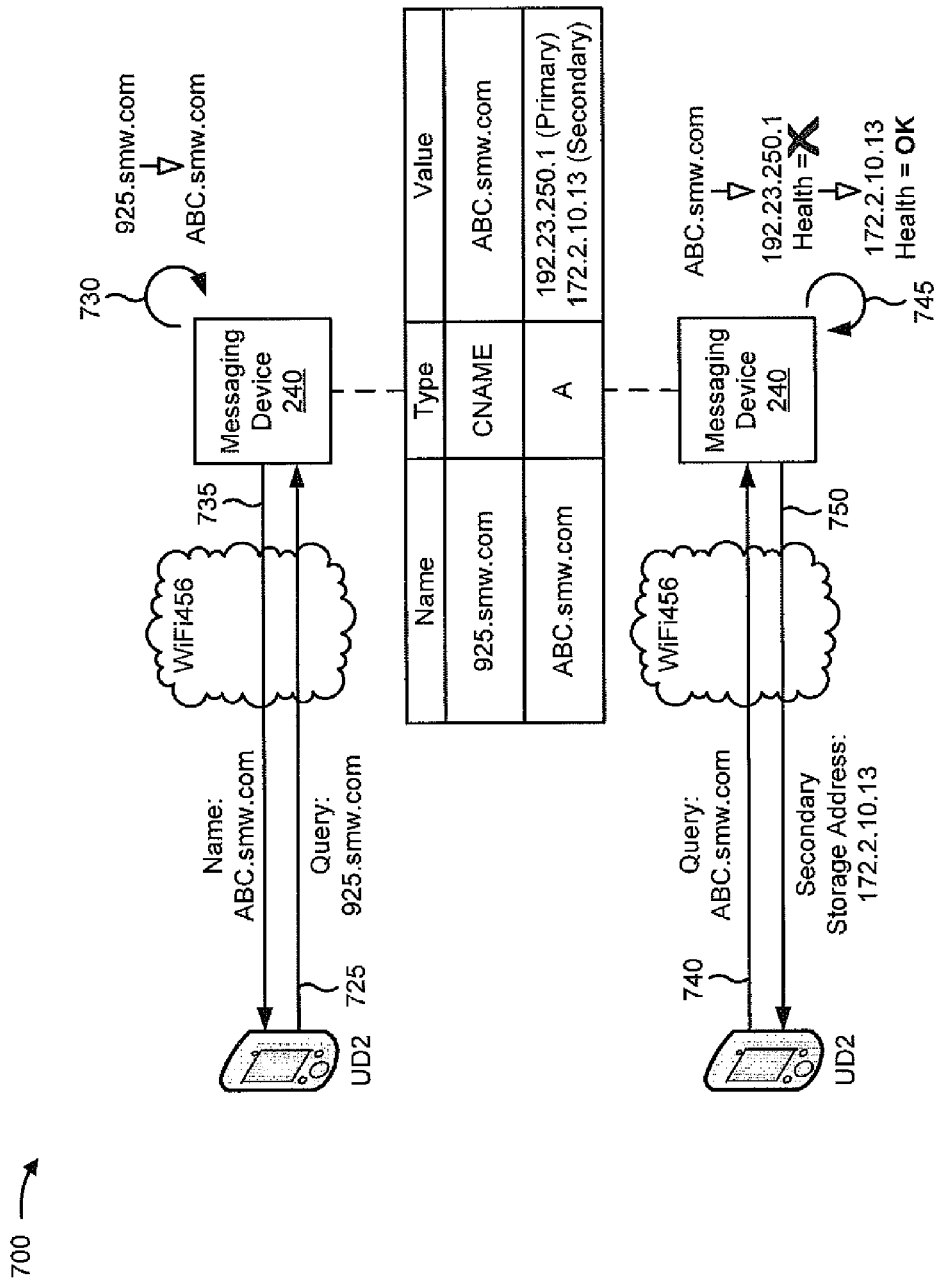

As shown in FIG. 7B, and by reference number 725, UD2 may generate (e.g., based on the 925 area code associated with UD2) a domain name (e.g., 925.smw.com) and may send a query to messaging device 240 associated with identifying a storage device associated with storing messages to be received by UD2. As shown by reference number 730, messaging device 240 may map the 925.smw.com domain name to a second domain name, ABC.smw.com, based on information (e.g., associated with a canonical name record ("CNAME")) stored by messaging device 240. As shown by reference number 735, messaging device 240 may provide the ABC.smw.com domain name to UD2.

As further shown in FIG. 7B, and by reference number 740, UD2 may send a query to messaging device 240 associated with the ABC.smw.com domain name. As shown by reference number 745, messaging device 240 may map the ABC.smw.com domain name to a primary storage device, associated with a primary IP address (e.g., 192.23.250.1), and may determine (e.g., based on information associated with a health check performed by messaging device 240) that the primary storage device is unable to provide the message to UD2. As shown, messaging device 240 may map the ABC.smw.com domain name to a secondary storage device, associated with a secondary IP address (e.g., 172.2.10.13), and may determine (e.g., based on information associated with a health check performed by messaging device 240) that the secondary storage device is able to provide the message to UD2. As shown by reference number 750, messaging device 240 may provide the IP address, associated with the secondary storage device, to UD2.

Figure 7C:
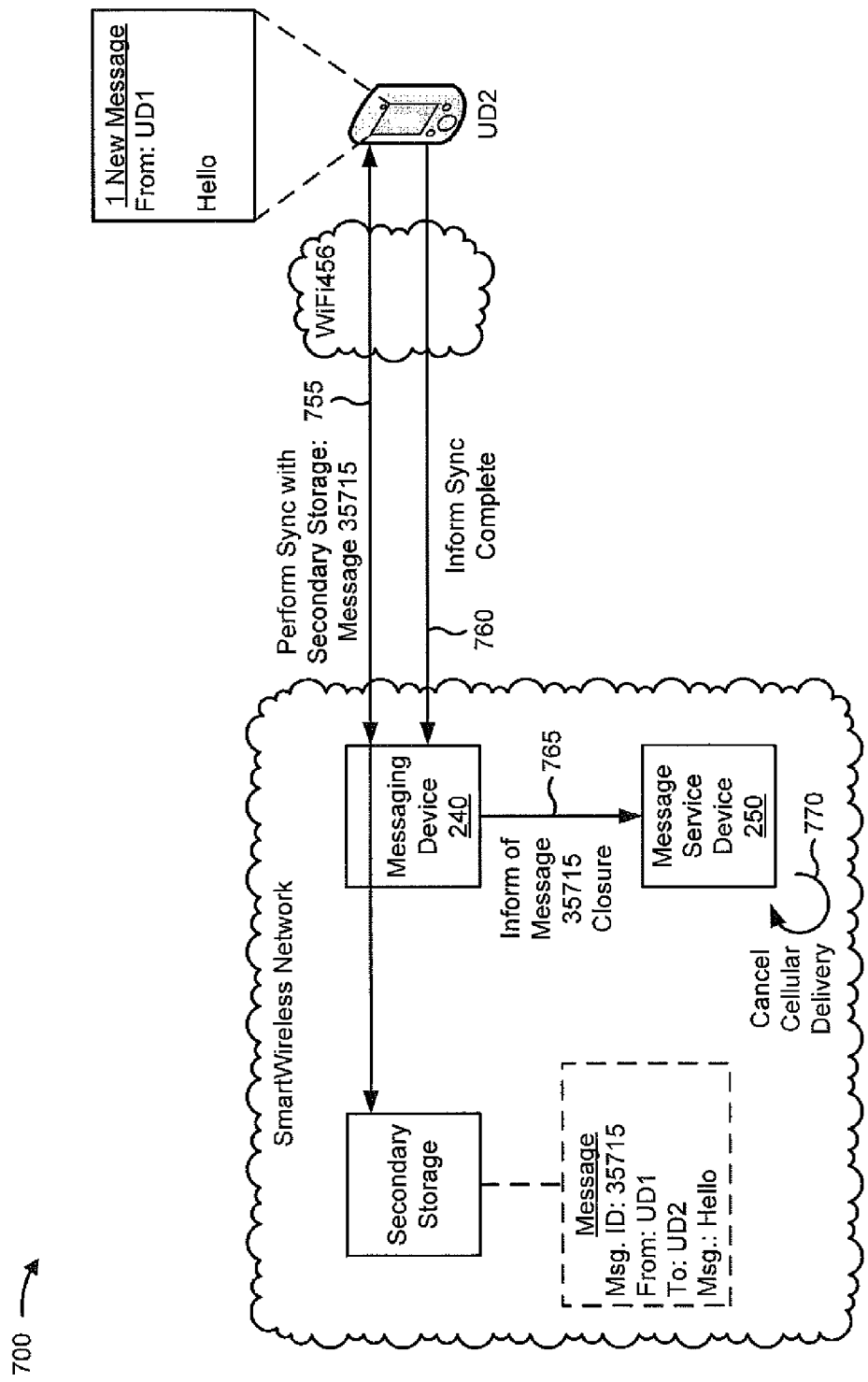

As shown in FIG. 7C, and by reference number 755, UD2 may synchronize with the secondary storage device (e.g., via messaging device 240) based on receiving the IP address associated with the secondary storage device. During the synchronization process, messaging device 240 may determine, based on information (e.g., received from UD2 and/or the secondary storage device) identifying one or more message identifiers associated with one or more messages received by UD2, that UD2 has not received the message (e.g., messaging device 240 may determine that UD2 has not received message 35715). Also, during the synchronization process, messaging device 240 may fetch the message (e.g., message 35715) from the secondary storage device, and may provide the message to UD2 via the WiFi456 network (e.g., since messaging device 240 has determined that UD2 has not received message 35715 and has received information indicating that UD2 may receive the message via the WiFi456 network).

As shown by reference number 760, UD2 may receive the message, and may provide, to messaging device 240, an indication that the synchronization process is complete (e.g., an indication that UD2 has received message 35715 and is fully synchronized with the secondary storage device). As shown by reference number 765, messaging device 240 may provide closure information (e.g., information indicating that message service device 250 is not to attempt to deliver the message via a cellular network) to message service device 250 based on receiving the indication from UD2. As shown by reference number 770, message service device 250 may receive the closure information and may cancel a future attempt to deliver the message.

Figure 7D:
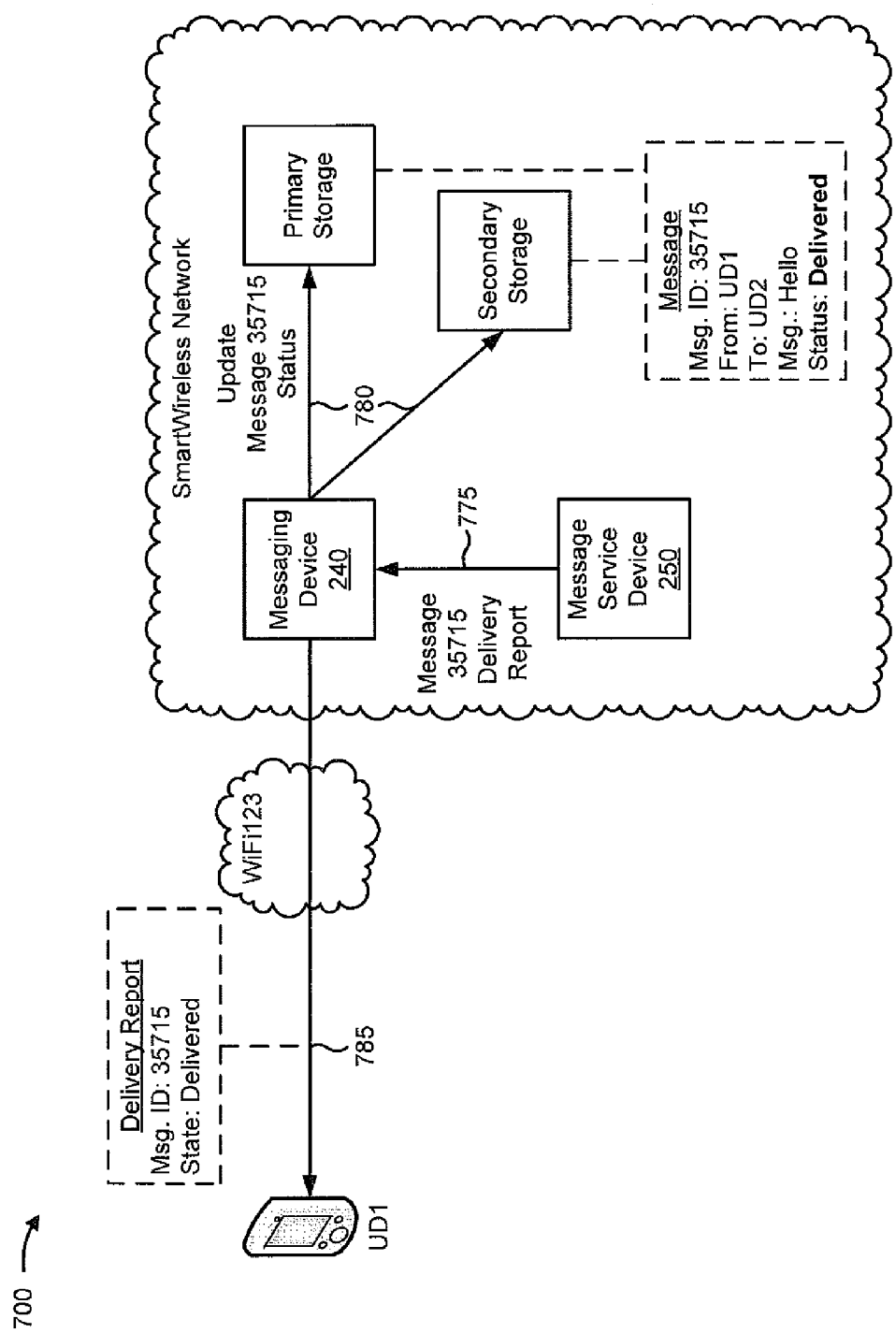

As shown in FIG. 7D, and by reference number 775, message service device 250 may provide a delivery report (e.g., information indicating that message 35715 has been received by UD2), to messaging device 240. As shown by reference number 780, messaging device 240 may provide information (e.g., information indicating that the message has been received by UD2) associated with the delivery report to the primary storage device and the secondary storage device. As shown, the primary storage device and the secondary storage device may receive the information, and may update the state of the message to indicate that the message has been delivered (e.g., "Delivered"). As shown by reference number 785, messaging device 240 may also provide the delivery report to UD1 to indicate that the message has been received by UD2 (e.g., where UD1 is connected to the WiFi123 network).

As indicated above, FIGS. 7A-7D are provided merely as an example. Other examples are possible and may differ from what was described with regard to FIGS. 7A-7D.

Implementations described herein may allow a sending device to send a message to a receiving device via a wireless local area network, and may allow the receiving device to receive the message via a wireless local area network (e.g., rather than sending and/or receiving the message via a cellular network). This may allow the message to be delivered to the receiving device where delivery via a cellular network is unavailable, and may reduce a cost associated with delivering the message via the cellular network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A device, comprising:
a memory to store instructions; and
one or more processors to execute the instructions to:
 receive a message to be received by a receiving device, the message being sent by a sending device and being stored by one or more storage devices;

determine that the message is to be received by the receiving device via a wireless local area network (WLAN);
send, to the receiving device, a notification associated with the message;
identify a storage device, of the one or more storage devices, to provide the message to the receiving device;
manage a synchronization between the receiving device and the storage device via the WLAN,
the synchronization causing the message to be received by the receiving device;
receive an indication that the receiving device has received the message; and
provide closure information based on receiving the indication that the receiving device has received the message,
the closure information including information used to cancel delivery of the message via a cellular network.

2. The device of claim 1, where the WLAN is a first WLAN, and
where the one or more processors, when receiving the message to be received by the receiving device, are to:
receive the message from the sending device via a second WLAN,
the second WLAN being different from the first WLAN.

3. The device of claim 1, where the one or more processors are further to:
receive information identifying the receiving device;
determine, based on the information identifying the receiving device, that the receiving device is capable of receiving the message via the WLAN; and
where the one or more processors, when determining that the message is to be received by the receiving device via the WLAN, are to:
determine that the message is to be received by the receiving device via the WLAN based on determining that the receiving device is capable of receiving the message via the WLAN.

4. The device of claim 1, where the one or more processors are further to:
receive information identifying an area code associated with the receiving device;
determine, based on the information identifying the area code, information that identifies a healthy storage device of the one or more storage devices,
the healthy storage device being capable of providing the message to the receiving device; and
where the one or more processors, when identifying the storage device, of the one or more storage devices, to provide the message to the receiving device, are to:
identify the storage device based on the information that identifies the healthy storage device.

5. The device of claim 1, where the one or more processors are further to:
determine that the receiving device has not received the message; and
where the one or more processors, when managing the synchronization between the receiving device and the storage device via the WLAN, are to:
manage the synchronization between the receiving device and the storage device based on determining that the receiving device has not received the message.

6. The device of claim 1, where the one or more processors, when managing the synchronization between the receiving device and the storage device via the WLAN, are to:
fetch the message from the storage device; and
forward the message to the receiving device.

7. The device of claim 1, where the one or more processors are further to:
receive a delivery report based on providing the closure information,
the delivery report being received from a particular device associated with delivering the message via the cellular network, and
the delivery report indicating that the receiving device has received the message; and
provide the delivery report to the sending device.

8. A non-transitory computer-readable medium storing instructions, the instructions comprising:
one or more instructions that, when executed by one or more processors operably coupled to a memory storing the one or more instructions, cause the one or more processors to:
obtain a message, associated with a sending device, to be sent to a receiving device;
the message being stored by at least one storage device;
determine that the message is to be sent to the receiving device via a wireless local area network (WLAN);
identify a storage device, of the at least one storage device, to provide the message to the receiving device;
manage a synchronization between the receiving device and the storage device via the WLAN,
the synchronization resulting in the message being sent to the receiving device;
receive an indication that the receiving device has received the message; and
send closure information based on receiving the indication that the receiving device has received the message,
the closure information including information used to cancel delivery of the message via a cellular network.

9. The non-transitory computer-readable medium of claim 8, where the WLAN is a first WLAN, and
where the one or more instructions, that cause the one or more processors to obtain the message to be sent to the receiving device, cause the one or more processors to:
obtain the message from the sending device via a second WLAN.

10. The non-transitory computer-readable medium of claim 8, where the one or more instructions, when executed by the one or more processors, further cause the one or more processors to:
receive information identifying the receiving device;
determine, based on the information identifying the receiving device, that the receiving device is to receive the message via the WLAN; and
where the one or more instructions, that cause the one or more processors to determine that the message is to be sent to the receiving device via the WLAN, cause the one or more processors to:
determine that the message is to be sent to the receiving device via the WLAN based on determining that the receiving device is to receive the message via the WLAN.

11. The non-transitory computer-readable medium of claim 8, where the one or more instructions, when executed by the one or more processors, further cause the one or more processors to:
  receive information identifying an area code associated with the receiving device;
  determine, based on the information identifying the area code, information that identifies a healthy storage device of the at least one storage device,
    the healthy storage device being capable of providing the message to the receiving device; and
  where the one or more instructions, that cause the one or more processors to identify the storage device, of the at least one storage device, to provide the message to the receiving device, cause the one or more processors to:
    identify the storage device based on the information that identifies the healthy storage device.

12. The non-transitory computer-readable medium of claim 8, where the one or more instructions, when executed by the one or more processors, further cause the one or more processors to:
  determine that the receiving device has not received the message; and
  where the one or more instructions, that cause the one or more processors to manage the synchronization between the receiving device and the storage device, further cause the one or more processors to:
    manage the synchronization between the receiving device and the storage device based on determining that the receiving device has not received the message.

13. The non-transitory computer-readable medium of claim 8, where the one or more instructions, that cause the one or more processors to manage the synchronization between the receiving device and the storage device, cause the one or more processors to:
  fetch the message from the storage device; and
  forward the message to the receiving device.

14. The non-transitory computer-readable medium of claim 8, where the one or more instructions, when executed by the one or more processors, further cause the one or more processors to:
  receive a delivery report based on sending the closure information,
    the delivery report being received from a device associated with delivering the message via the cellular network, and
    the delivery report indicating that the receiving device has received the message; and
  provide the delivery report to the sending device.

15. A method, comprising:
  receiving, by a device comprising a memory operably coupled to one or more processors, a message associated with a receiving device,
    the message being sent by a sending device and being stored by a set of storage devices;
  determining, by the device, that the message is to be received by the receiving device via a wireless local area network (WLAN);
  identifying, by the device, a storage device, in the set of storage devices, to provide the message to the receiving device;
  managing, by the device, a synchronization between the receiving device and the storage device via the WLAN,
    the synchronization including delivering the message to the receiving device;
  receiving, by the device, information indicating that the receiving device has received the message; and
  transmitting, by the device, closure information based on receiving the information indicating that the receiving device has received the message,
    the closure information including information used to cancel the message via a cellular network.

16. The method of claim 15, further comprising:
  receiving information identifying an area code associated with the receiving device;
  determining, based on the information identifying the area code, information that identifies a healthy storage device in the set of storage devices,
    the healthy storage device being capable of providing the message to the receiving device; and
  where identifying the storage device, in the set of storage devices, to provide the message to the receiving device comprises:
    identifying the storage device based on the information that identifies the healthy storage device.

17. The method of claim 15, further comprising:
  receiving information identifying the receiving device;
  determining, based on the information identifying the receiving device, that the receiving device is capable of receiving the message via the WLAN; and
  where determining that the message is to be received by the receiving via the WLAN comprises:
    determining that the message is to be received by the receiving device via the WLAN based on determining that the receiving device is capable of receiving the message via the WLAN.

18. The method of claim 15, further comprising:
  determining that the receiving device has not received the message; and
  where managing the synchronization between the receiving device and the storage device via the WLAN comprises:
    managing the synchronization between the receiving device and the storage device based on determining that the receiving device has not received the message.

19. The method of claim 15, where managing the synchronization between the receiving device and the storage device via the WLAN comprises:
  fetching the message from the storage device; and
  forwarding the message to the receiving device.

20. The method of claim 15, further comprising:
  receiving a delivery report based on transmitting the closure information,
    the delivery report being received from a device associated with delivering the message via the cellular network, and
    the delivery report indicating that the receiving device has received the message; and
  providing the delivery report to the sending device.

* * * * *